United States Patent
Park et al.

(10) Patent No.: US 7,586,826 B2
(45) Date of Patent: Sep. 8, 2009

(54) COMPATIBLE OPTICAL PICKUP

(75) Inventors: Soo-han Park, Yongin-si (KR); Bong-gi Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 429 days.

(21) Appl. No.: 10/882,154

(22) Filed: Jul. 1, 2004

(65) Prior Publication Data

US 2005/0030878 A1    Feb. 10, 2005

(30) Foreign Application Priority Data

Jul. 1, 2003    (KR) .................. 10-2003-0044246

(51) Int. Cl.
G11B 7/135    (2006.01)

(52) U.S. Cl. .................. 369/112.1; 369/112.08; 369/112.26; 359/19

(58) Field of Classification Search ............... 359/19; 369/112.08, 112.1, 112.02, 103, 112.15, 369/112.01, 112.03

See application file for complete search history.

(56) References Cited

U.S. PATENT DOCUMENTS

| | | | | |
|---|---|---|---|---|
| 6,084,843 | A * | 7/2000 | Abe et al. | 369/112.07 |
| 6,449,235 | B1 * | 9/2002 | Kim et al. | 369/112.01 |
| 6,873,588 | B1 * | 3/2005 | Mizuno et al. | 369/112.01 |
| 6,950,384 | B2 * | 9/2005 | Arai et al. | 369/121 |
| 6,992,967 | B2 * | 1/2006 | Jeong | 369/112.1 |
| 7,206,276 | B2 * | 4/2007 | Kimura et al. | 369/112.08 |
| 2003/0021215 | A1 * | 1/2003 | Yoo et al. | 369/112.08 |
| 2003/0227858 | A1 * | 12/2003 | Komma | 369/112.08 |

FOREIGN PATENT DOCUMENTS

| | | |
|---|---|---|
| JP | 2001-43559 | 2/2001 |
| JP | 2002-298422 | 10/2002 |
| KR | 2001-39383 | 5/2001 |
| KR | 2001-73413 | 8/2001 |
| KR | 2001-89534 | 10/2001 |
| KR | 2001-100318 | 11/2001 |

* cited by examiner

Primary Examiner—Wayne R Young
Assistant Examiner—Thomas D Alunkal
(74) Attorney, Agent, or Firm—Staas & Halsey LLP

(57) ABSTRACT

An optical pickup which is compatible with at least one high density recording medium that uses a blue-violet beam and at least one lower density recording medium, the optical pickup including: an optical unit to selectively emit one of a plurality of beams with different wavelengths onto one of the at least one high density recording medium and the at least one lower density recording medium, and to receive the respective beam reflected from the respective recording medium; and a holographic objective lens to focus the respective beams emitted by the optical unit on a recording surface of the respective recording medium, the holographic objective lens including a first holographic lens region and a second holographic lens region located inside the first holographic lens region, wherein holographic patterns of the first and second holographic lens regions respectively produce a first effective numerical aperture (NA) for the at least one high density recording medium and at least one additional effective NA suitable for the at least one lower density recording medium.

46 Claims, 7 Drawing Sheets

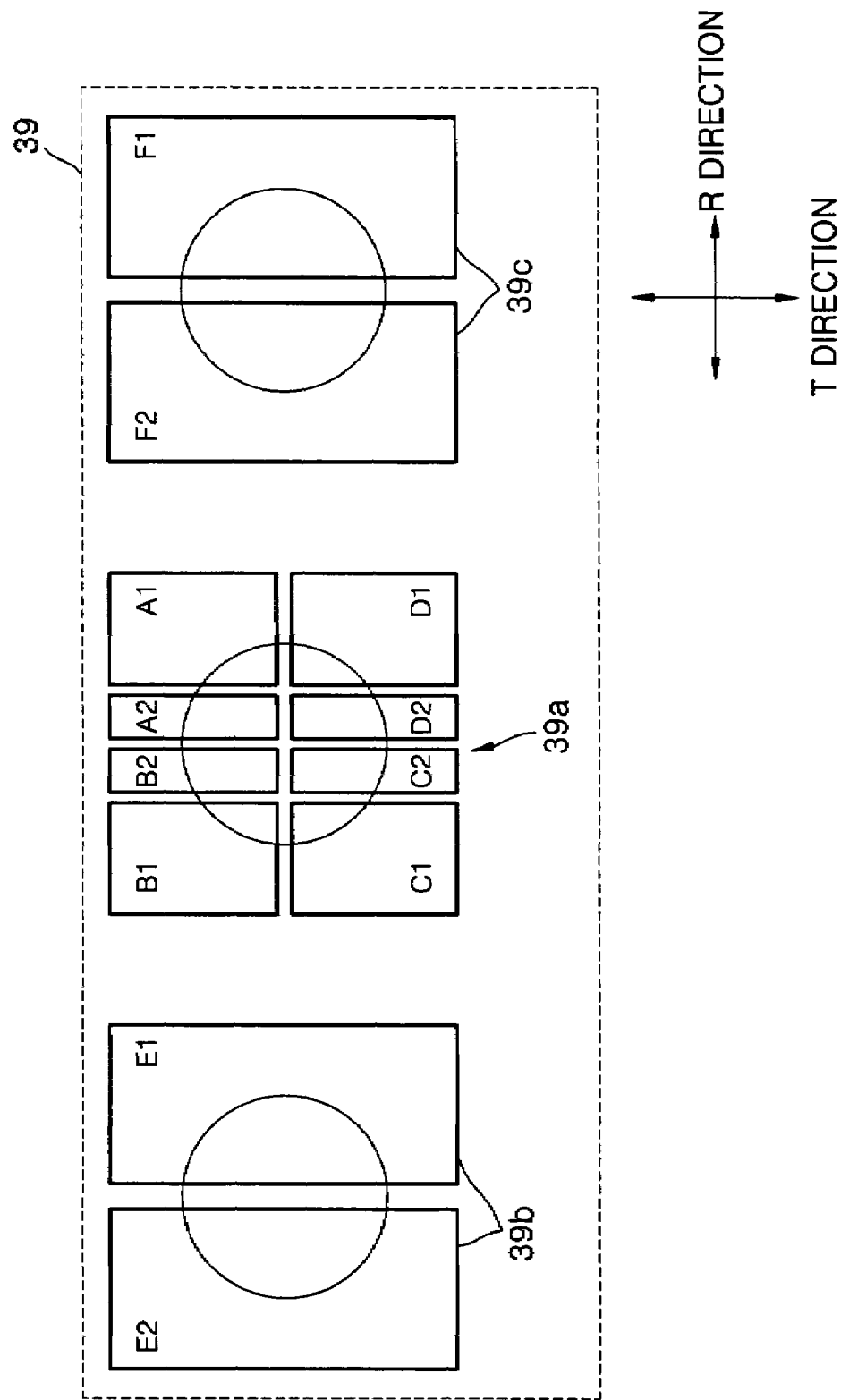

COMPATIBLE OPTICAL PICKUP

CROSS-REFERENCE TO RELATED APPLICATIONS

This application claims the benefit of Korean Patent Application No. 2003-44246, filed on Jul. 1, 2003, in the Korean Intellectual Property Office, the disclosure of which is incorporated herein by reference.

BACKGROUND OF THE INVENTION

1. Field of the Invention

The present invention relates to a compatible optical pickup, and, more particularly, to a compatible optical pickup designed to record and/or reproduce information on and/or from recording media having different formats such as high density recording media using blue-violet light and lower density DVD and/or CD formats.

2. Description of the Related Art

In an optical recording and/or reproducing apparatus for recording and/or reproducing information to and/or from a disc type recording medium using a light spot focused by an objective lens, the recording density is determined by the size of the light spot. Equation (1) defines a light spot size S that is determined by a wavelength λ of light and a Numerical Aperture (NA) of the objective lens:

$$S \propto \lambda/NA \tag{1}$$

Since the emergence of a CD technology designed to record and/or reproduce information using light having a wavelength of 780 nm and an objective lens with an NA of 0.45 or 0.5, much research has been conducted to increase data storage capacity by increasing the areal recording density. This research has resulted in a DVD technology designed to record and/or reproduce information using light having a wavelength of 650 nm and an objective lens with an NA of 0.6 or 0.65.

Ongoing studies are now underway to develop high density recording media that can offer over 20 GB of recording capacity using blue-violet light of a predetermined wavelength, e.g., 405 nm. Standards on high density recording media are actively under development, some of which are almost finalized. The standards specify use of blue-violet light of a 405 nm wavelength and an objective lens with an NA of 0.65 or 0.85, which will be described below.

The standards also set a thickness of a DVD disc to 0.6 mm, which is 50% less than the 1.2 mm of a conventional CD disc. This is aimed at providing a tolerance due to a tilt of the recording medium, since the NA of a DVD disc's objective lens increases to 0.6, which is higher than the 0.45 NA of a conventional CD disc's objective lens.

In a case in which a tilt angle of a recording medium is θ, the refractive index is n, its thickness is d, and the NA of an objective lens is NA, a coma aberration $W_{31}$ caused by a tilt of the recording medium is defined by Equation (2):

$$W_{31} = -\frac{d}{2} \frac{n^2(n^2-1)\sin\theta\cos\theta}{(n^2-\sin^2\theta)^{5/2}} NA^3 \tag{2}$$

Here, the refractive index and thickness of the recording medium refers to those of an optical medium from an incident surface to a recording surface.

As is evident by Equation (2), in order to provide a tolerance due to the tilt of the recording medium, the thickness of the recording medium must be reduced if the NA of the objective lens is increased for high-density recording.

Thus, for example, if the NA of the objective lens for a high density recording medium is increased to 0.85, the high density recording medium must be about 0.1 mm thick. A blu-ray disc (BD) is a recording technology that increases the recording density by increasing the NA of an objective lens while reducing the thickness of the recording medium. A BD standard specifies a 405 nm wavelength light source, 0.85 NA objective lens, and an approximately 0.1 mm thick recording medium.

Here, examples of the high-density recording medium include a BD and an advanced optical disc (AOD). The AOD uses a light source with a 405 nm wavelength and an objective lens with a 0.65 NA. The thickness of the recording medium is 0.6 mm, as in the DVD. While the BD achieves a higher recording density than the AOD, the AOD is advantageous over the BD because of the AOD's reverse compatibility with the DVD format and the easy manufacturing of the AOD due to the NA of the objective lens and the disc thickness being the same as those of the DVD. Meanwhile, for write-once media such as DVD-R and CD-R, light sources with 650 nm and 780 nm wavelengths must be used since reflectivity significantly decreases according to wavelength.

Thus, an optical pickup designed for compatibility between the high density recording media using blue-violet light and the lower density DVD and/or CD formats uses two objective lenses for the high density recording media and DVD and/or CD, taking into consideration a spherical aberration caused by a thickness difference between the two types of recording media formats and the NA required for each recording media format. In addition, considering compatibility with DVD-R and/or CD-R formats, the optical pickup for high density recording media adopts two or three light sources having different wavelengths. In this case, optical systems for high density recording media and DVD and/or CD discs have different configurations.

Thus, due to the complicated optical system and large number of optical components, the conventional compatible optical pickup has several problems such as high manufacturing costs, low reliability, and degradation in assembling and adjustment capabilities. The low reliability is caused by a deviation between the optical components during high temperature operation. Since the number of optical components increases as the number of adhesive-bonded points increases, optical components tend to deviate easily during high temperature operation, and deviation in the overall optical system becomes more severe. The large number of components also results in an increase in assembling error during assembling.

SUMMARY OF THE INVENTION

The present invention provides a compatible optical pickup with a simple optical system designed to record and/or reproduce data to/from high density recording media using blue-violet light as well as lower density recording media using a single objective lens.

Additional aspects and/or advantages of the invention will be set forth in part in the description which follows and, in part, will be obvious from the description, or may be learned by practice of the invention.

According to an aspect of the present invention, there is provided an optical pickup which is compatible with at least one high density recording medium that uses a blue-violet beam and is thinner than a digital versatile disc (DVD), and at least one lower density recording medium, the compatible optical pickup comprising: an optical unit to selectively emit one of a plurality of beams, at least one of which being the blue-violet beam, with different wavelengths onto one of the at least one high density recording medium and the at least one lower density recording medium, and to receive the respective beam reflected from the respective recording medium to detect a reproduced information signal and/or error signal; and a holographic objective lens to focus the respective beams emitted by the optical unit to a spot on a recording surface of the respective recording medium, the holographic objective lens comprising: a first ring-shaped holographic lens region, and a second holographic lens region located inside the first holographic lens region, wherein depths of holographic patterns of the first and second holographic lens regions respectively produce a first effective numerical aperture (NA) for the at least one high density recording medium and at least one additional effective NA suitable for the at least one lower density recording medium.

The optical unit may include a light source module to emit the one of the plurality of beams, a first light path changer to change a propagation path of the respective beam emitted by the light source module, and a photodetector to receive the respective beam reflected from the recording medium and detect the information signal and/or error signal.

The at least one of the lower density recording medium may include a DVD and a compact disc (CD), and the light source module may comprise a first light source to emit the blue-violet beam onto the at least one high density recording medium, a second light source to emit a red beam onto the DVD, and a third light source to emit an infrared beam onto the CD.

Alternatively, the optical unit may include a first light source to emit the blue-violet beam onto the at least one high density recording medium, a two wavelength light source module to selectively emit infrared and red beams onto the CD and the DVD, respectively, a first light path changer to change a propagation path of the beam emitted by the first light source, and a second light path changer to change a propagation path of the respective beams emitted by the two wavelength light source module. The optical unit may include a first light source to emit the blue-violet beam onto the at least one high density recording medium, a second light source to emit a red beam onto the DVD, a third light source to emit an infrared beam onto the CD, and first through third light path changers to respectively change propagation paths of the beams emitted by the first through third light sources.

The first light path changer may be a polarization beam splitter which splits the blue-violet beam, and the optical pickup may further include a wave plate, disposed between the first light path changer and the objective lens, to change the polarization of an incident beam. The wave plate may be a quarter wave plate for the blue-violet beam. The optical pickup may further include a liquid crystal panel, disposed on an optical path between the first light path changer and the wave plate, to compensate for a spherical aberration induced by a thickness of the at least one high-density recording medium during recording and/or reproducing data to/from the at least one high density recording medium.

The holographic objective lens may further comprise a third holographic lens region, disposed inside the second holographic lens region; wherein the second holographic lens region is ring-shaped, and produces a second effective NA for the DVD; the third lens region produces a third effective NA for the CD, and the first holographic lens region and the second holographic lens region are designed to minimize the transmissivity of an infrared beam emitted onto the CD. The first holographic lens region may have a first holographic pattern optimized with respect to the at least one high density recording medium, and the second holographic lens region may have a second holographic pattern optimized with respect to the DVD and the at least one high density recording medium. The first holographic lens region, the second holographic lens region, and the third lens region may have widths corresponding to NAs of 0.7 to 0.9, 0.6 to 0.7, and 0.45 to 0.6, respectively.

Alternatively, the first holographic lens region may have a holographic pattern optimized with respect to the at least one high density recording medium, and the second holographic lens region may have a holographic pattern optimized with respect to the DVD and the at least one high density recording medium. In this case, the first and second holographic lens regions may have widths corresponding to NAs of 0.7 to 0.9 and 0.6 to 0.7, respectively.

The at least one high density recording medium may be a BD having a single recording layer or a plurality of recording layers on at least one side thereof. The at least one high density recording medium may further include an advanced optical disc (AOD) having approximately the same thickness as the DVD.

BRIEF DESCRIPTION OF THE DRAWINGS

The above and/or other aspects and advantages of the invention will become apparent and more readily appreciated from the following description of the embodiments taken in conjunction with the accompanying drawings in which:

FIG. 5 illustrates a photo detector for a compatible optical pickup of the present invention according to an embodiment of the present invention;

DETAILED DESCRIPTION OF THE PREFERRED EMBODIMENTS

Figure 1:
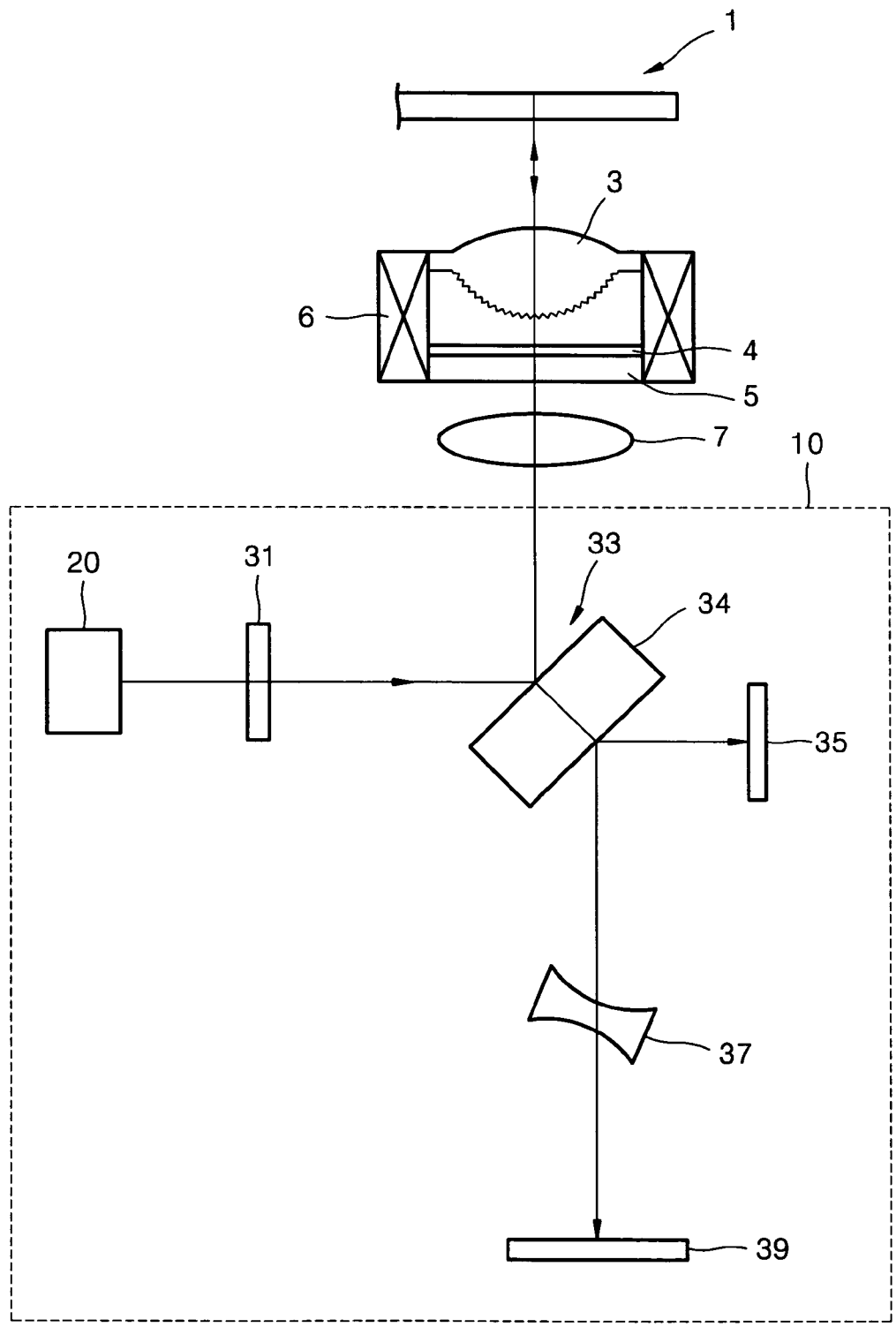
FIG. 1 schematically illustrates the optical configuration of a compatible optical pickup according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 6:
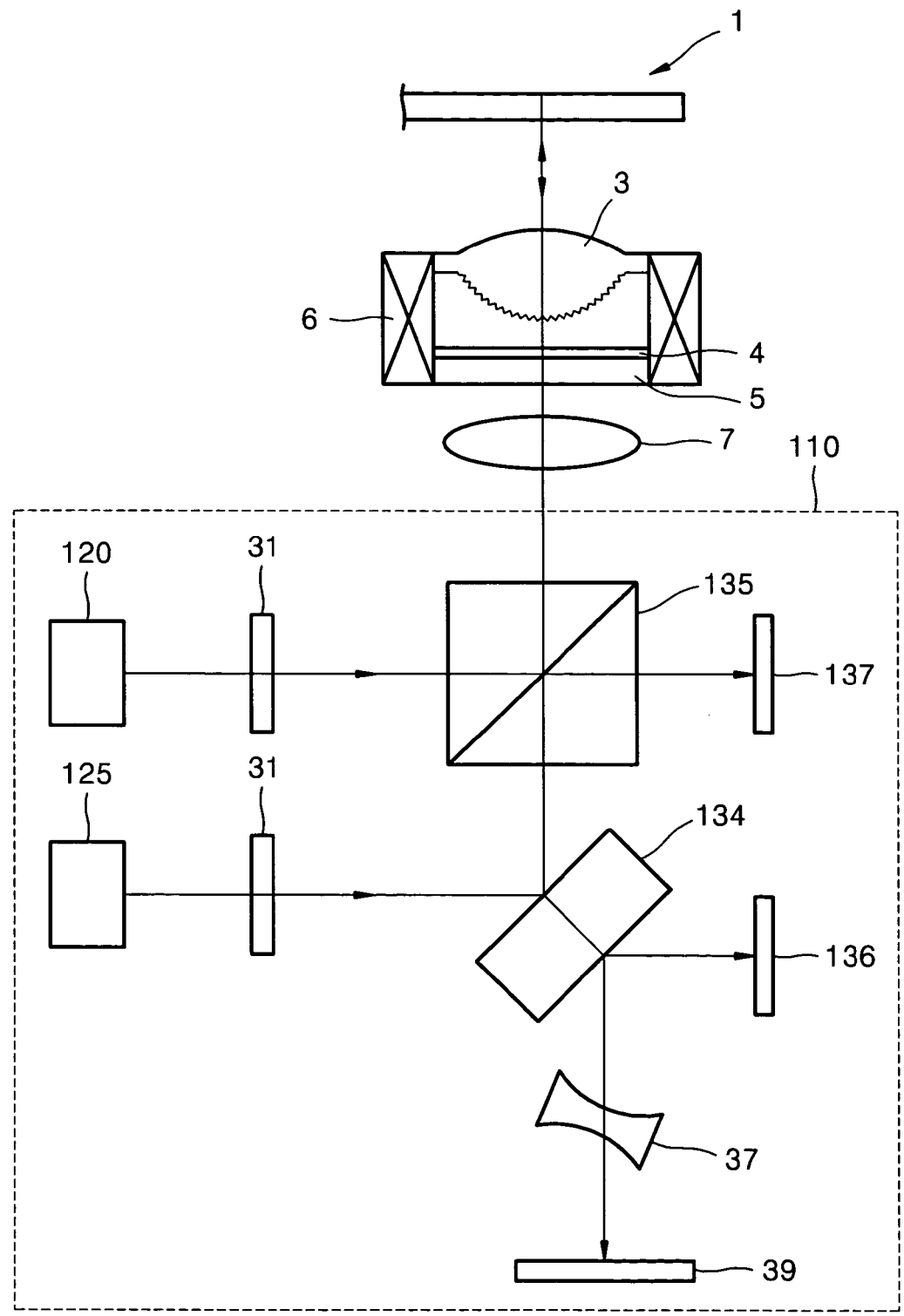
FIG. 6 schematically illustrates the optical configuration of a compatible optical pickup according to another embodiment of the present invention.
Figure 7:
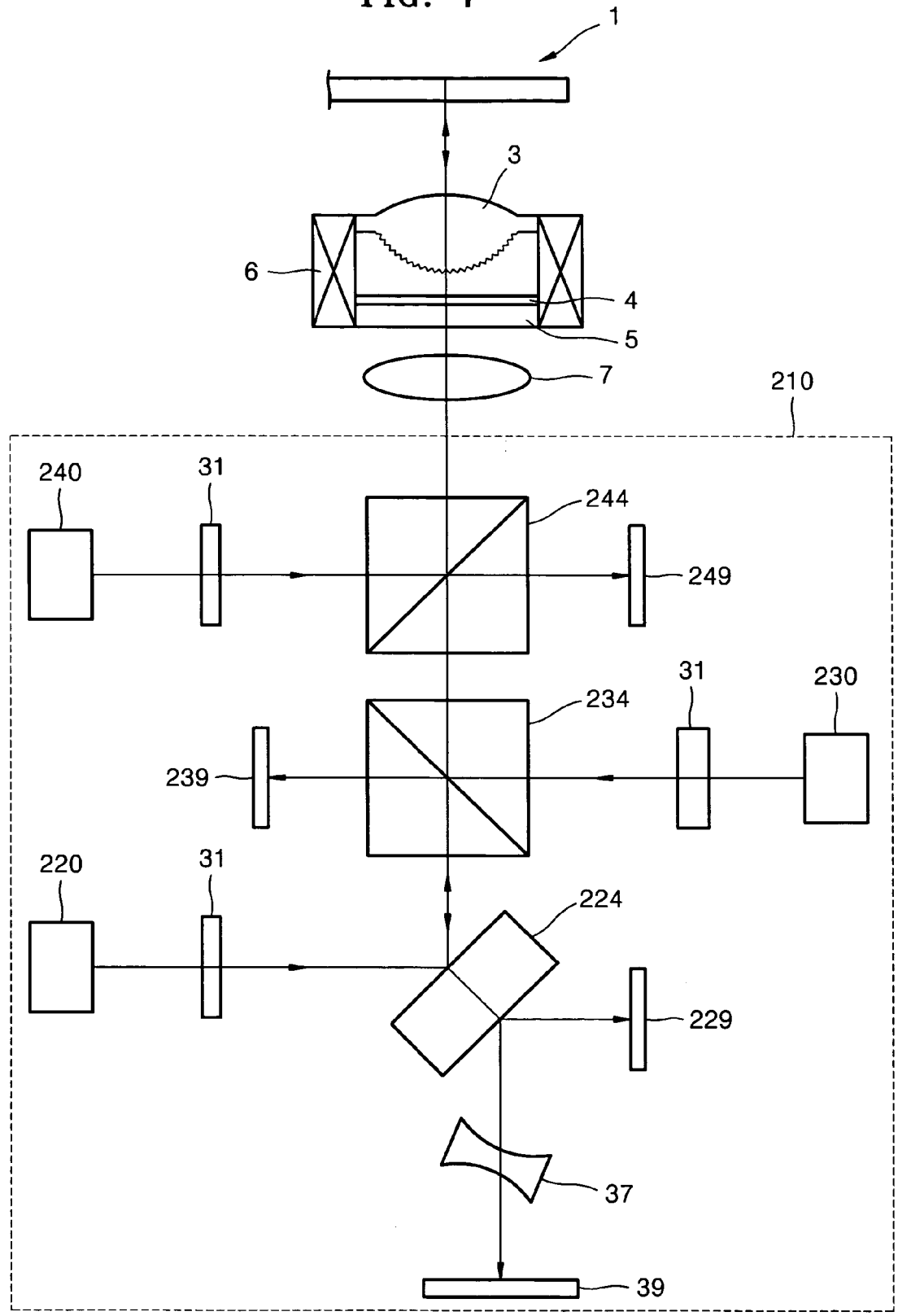
FIG. 7 schematically illustrates the optical configuration of a compatible optical pickup according to another embodiment of the present invention.

Referring to FIGS. 1, 6, and 7, to achieve compatibility among a plurality of recording media having different recording densities and formats using a single objective unit, compatible optical pickups according to embodiments of the present invention include optical units 10, 110, and 210, respectively, and an objective lens 3. Each of the optical units 10, 110, and 210 emits light of a wavelength suitable for each of a plurality of recording media onto a recording medium 1, and receives light reflected from the recording medium 1 to detect an information signal and/or error signal. The objective lens 3 focuses the incident light to a spot on a recording surface of the recording medium 1. The optical pickup according to the present invention may further include a liquid crystal panel 5 to compensate for a spherical aberration induced while recording and/or reproducing the recording medium 1 having a plurality of recording layers on at least one side thereof.

Here, the plurality of recording media include either or both CD and DVD, and high density recording media with over 20 GB storage capacity using blue-violet light. The CD refers to recording media of a CD family including at least one of CD-ROM, CD-R, and CD-RW, and the DVD refers to recording media of a DVD family including at least one of DVD-ROM, DVD-R, DVD±RW, and DVD-RAM. Like the CD and DVD, the high density recording media includes various read-only and/or recordable high density recording media. Examples of the high density recording media include a blu-ray disc (BD), which is thinner than a DVD disc, and/or an advanced optical disc (AOD). As described earlier, while the BD uses a 405 nm wavelength light source, 0.85 Numerical Aperture (NA) objective lens, and approximately 0.1 mm thick recording medium, the AOD uses a 405 nm wavelength light source, 0.65 NA objective lens, and 0.6 mm thick recording medium, which is the same thickness as the DVD.

Currently, groups engaged in development of high density recording media are largely divided into BD and AOD groups. The high density recording media of the present invention are not limited to either or both of current BD and AOD standards. That is, the high density recording media may conform to either or both of current BD and AOD standards, or to various specifications that offer less than or over 20 GB recording capacity, and which may or may not use blue-violet light for the high density recording media.

Referring to FIG. 1, the optical unit 10 according to this embodiment of the present invention includes a light source module 20 that emits a plurality of beams having different wavelengths, a light path changer 33 that changes the propagation path of the beams emitted from the light source module 20, and a photodetector 39 that receives a beam reflected from the recording surface on the recording medium 1 in order to detect an information signal and/or error signal.

Figure 2A:
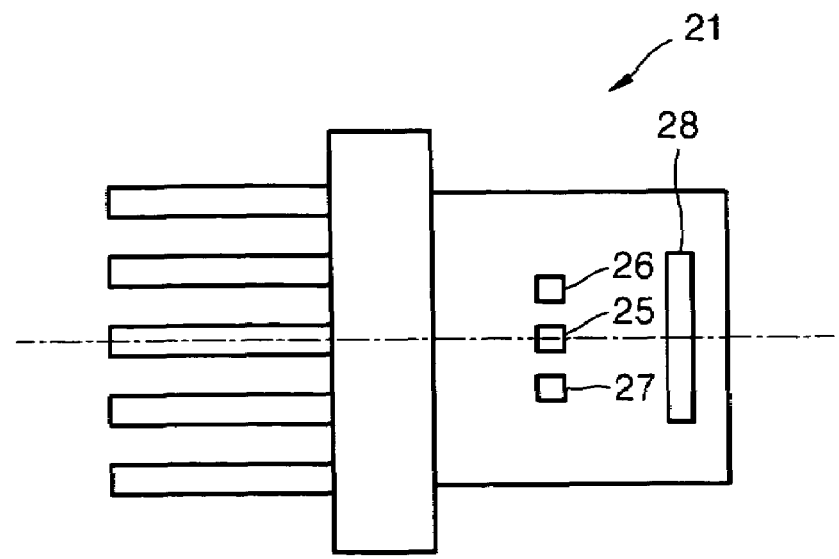
FIGS. 2A, 2B, 3A, and 3B illustrate light source modules that can be applied to the compatible optical pickup of FIG. 1 according to embodiments of the present invention.
Figure 2B:
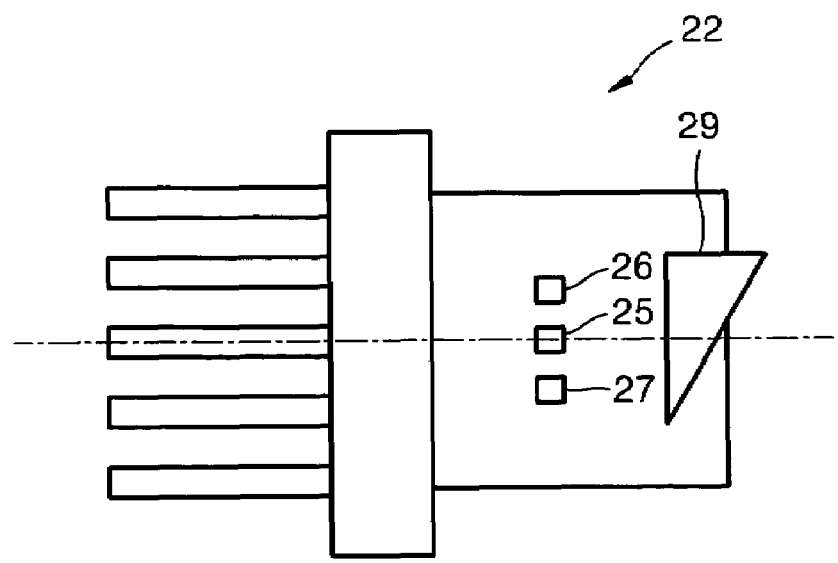

FIGS. 2A and 2B illustrate two light source modules 21 and 22 that can be applied to the optical pickup of FIG. 1 according to embodiments of the present invention.

Referring to FIG. 2A, the light source module 21 comprises first through third light sources 25-27 that are disposed in a housing in which the light source module 21 is packaged, and which emit beams having different wavelengths. The light source module 21 may further include a transparent window 28 disposed at the position of an exit pupil. Referring to FIG. 2B, the light source module 22 may include a beam-shaping prism 29 at the exit pupil instead of the transparent window 28 of FIG. 2A. When an elliptical beam is emitted from a semiconductor laser used as the first through third light sources 25-27, the beam-shaping prism 29 can convert the elliptical beam into a circular one, thereby increasing the efficiency of light utilization.

Although FIGS. 2A and 2B have illustrated the light source modules 21 and 22 having the three light sources 25-27, respectively, the light source modules 21 and 22 may only include two light sources, respectively. In this case, the two light sources may be a first light source that emits blue-violet light having a 405 nm wavelength, suitable for a high density recording medium, and a second light source that emits red light having a 650 nm wavelength suitable for a DVD.

Figure 3A:
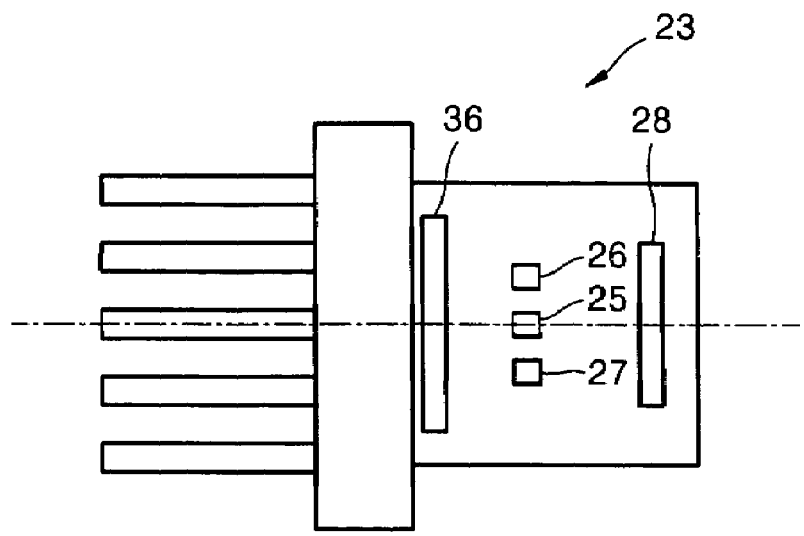
Figure 3B:
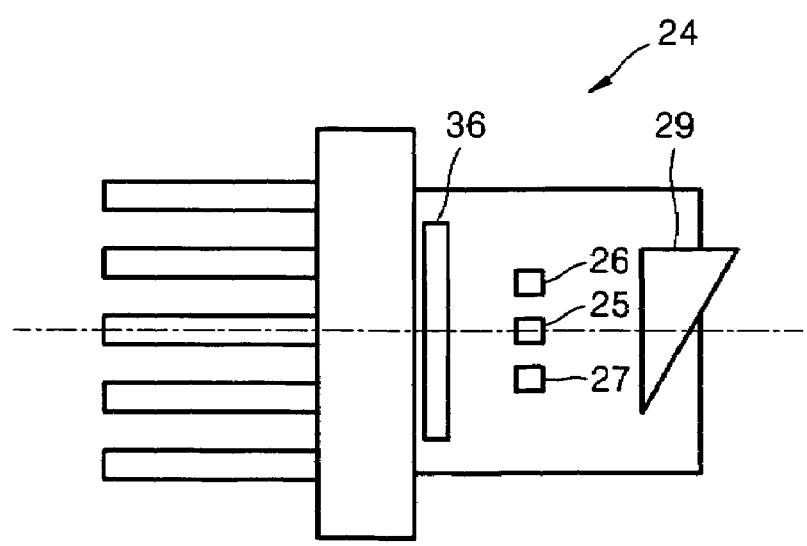

Meanwhile, although FIG. 1 has illustrated an embodiment of the optical pickup including a monitor photodetector 35 to receive a beam that is emitted from the light source module 20 and passes through a polarization beam splitter 34, the optical pickup may instead include a light source module 23 or 24, shown in FIG. 3A or 3B, having a monitor photodetector 36 inside the light source module 23 or 24. In this case, the monitor photodetector 36 is positioned to the rear of the first through third light sources 25-27. FIGS. 3A and 3B show the light source modules 23 and 24 having configurations corresponding to those shown in FIGS. 2A and 2B, respectively.

An example of the light source module 20 with the first through third light sources 25-27 that can be adopted in the optical pickup according to this embodiment of the present invention will now be described. When the light source module 20 includes of the first through third light sources 25-27, preferably, though not necessarily, the first light source 25 emits a blue-violet beam having a 405 nm wavelength suitable for a high density recording medium, the second light source 26 emits a red beam having a 650 nm wavelength suitable for a DVD, and the third light source 27 emits an infrared beam having a 750 nm wavelength suitable for a CD. As illustrated in FIGS. 2A-3B, the first light source 25, used for recording and/or reproducing the high density recording medium with the largest storage capacity, is preferably, though not necessarily, disposed along a central axis.

The optical pickup may further include a holographic optical element (not shown) to compensate for misalignment of an optical axis, so that the paths of the beams emitted by the second and third light sources 26 and 27 are equal to that of the beam emitted by the first light source 25. The holographic optical element may be disposed between the light source module 20 and the light path changer 33 or between the light path changer 33 and the photodetector 39.

Meanwhile, in the case in which the optical pickup includes the liquid crystal panel 5 to compensate for a spherical aberration as shown in FIG. 1, preferably, though not necessarily, the light path changer 33 may be the polarization beam splitter 34 that selectively transmits or reflects an incident beam depending on the polarization state, and the optical pickup further may include a waveplate 4 disposed between the polarization beam splitter 34 and the objective lens 3 to change the polarization of the incident beam. More preferably, though not necessarily, the waveplate 4 may be positioned between the liquid crystal panel 5 and the objective lens 3. The polarization beam splitter 34 may selectively transmit or reflect the blue-violet beam, emitted from the first light source 25 for the high density recording medium, depending on the polarization state while transmitting and reflecting the red and infrared beams emitted from the second and third light sources 26 and 27 at a predetermined ratio. Alternatively, it may act as a polarization beam splitter that selectively transmits or reflects all of the beams emitted from the first through third light sources 25-27 depending on the polarization states of the incident beams. It is possible to realize a polarization beam splitter that satisfies the above requirements by adjusting a material and thickness of coating applied on the mirror surface of the polarization beam splitter. The waveplate 4 preferably, though not necessarily, acts as a quarter waveplate with respect to the beam emitted by the first light source 25.

Although the polarization beam splitter 34 shown in FIG. 1 is plate-shaped, it may be cubic. The objective lens 3 may be a holographic objective lens that adjusts the NA by selectively diffracting the incident beam according to the wavelength thereof.

The objective lens 3 may be formed to indicate a first effective NA when the blue-violet beam having a 405 nm wavelength is emitted by the first light source 25 and a high density recording medium such as a BD, which is thinner than a DVD, is applied, a second effective NA suitable for a DVD corresponding to the red beam having a 650 nm wavelength emitted by the second light source 26, and a third effective NA suitable for a CD corresponding to an infrared beam having a 780 nm wavelength emitted by the third light source 27. Here, the first effective NA may be 0.85, the second effective NA may be 0.6 (read-only) or 0.65 (recordable), and the third effective NA may be 0.45 (read-only) or 0.5 (recordable).

Here, the first and second effective NAs are applied when the high density recording media are the BD and AOD, respectively. Thus, when the compatible optical pickup is designed for compatibility among CD, DVD, AOD and BD formats or CD, DVD, and BD formats, the objective lens 3 may be formed to indicate selectively the first through third effective NAs according to the wavelength of an incident beam. To achieve this compatibility, the objective lens 3 may be designed in a manner described below.

An optimum depth d of a pattern created by surface etching for a holographic lens is given by Equation (3) or (4) below. The conditions of a depth of a pattern created by etching for achieving light transmissivities of 100% and 0% are expressed by the Equations (3) and (4), respectively:

$$\frac{2\pi d}{\lambda}(n-1) = 2m\pi \quad (3)$$

$$\frac{2\pi d}{\lambda}(n-1) = 2(m+1)\pi \quad (4)$$

where m is an integer, n is a refractive index, and $\lambda$ is the wavelength.

Figure 4A:
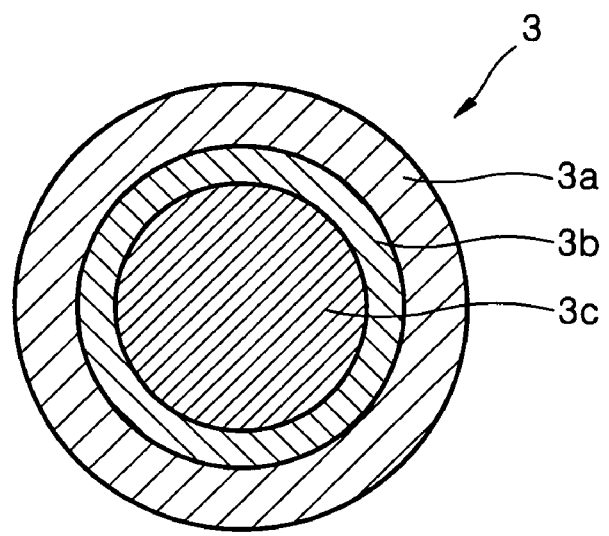
FIGS. 4A and 4B schematically illustrate the configurations of holographic objective lenses according to embodiments of the present invention.

The holographic objective lens 3, which may be optimized for three beams of different wavelengths, can be produced by using Equations (3) and (4) above. As shown in FIG. 4A, the holographic objective lens 3 includes a first holographic lens region 3a optimized with respect to a BD and a second holographic lens region 3b optimized with respect to a high density recording medium and DVD. The first and second holographic lens regions 3a and 3b are ring-shaped. Preferably, though not necessarily, the holographic objective lens 3 further includes a third holographic lens region 3c located inside the second holographic lens region 3b. The third holographic lens region 3c has a holographic pattern with an etching depth that maximizes the transmissivity of three beams having different wavelengths for CD, DVD, and a high density recording medium.

The first holographic lens region 3a has a holographic pattern of an etching depth optimized with respect to the BD in such a way as to maximize the transmissivity of the blue-violet beam for the high density recording medium, and minimize that of the infrared and red beams for CD and DVD, respectively. The second holographic lens region 3b has a holographic pattern of an etching depth optimized with respect to the high density recording medium and DVD in such a way as to maximize the transmissivity of the beams for the high density recording medium and DVD, and minimize that of the beam for CD.

For example, the first through third holographic lens regions 3a-3c may have widths corresponding to NAs of 0.7 to 0.9, 0.6 to 0.7, and 0.45 to 0.6, respectively. With the holographic objective lens 3 it is possible to achieve the first through third effective NAs suitable for BD, DVD, and CD, respectively.

Figure 4B:
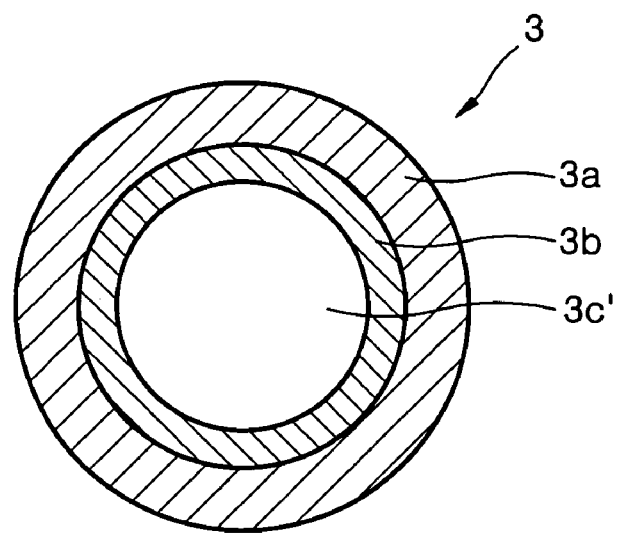

The holographic objective lens 3 has a holographic lens surface encompassing the first through third holographic lens regions 3a-3c on the front surface. The holographic lens surface is preferably, though not necessarily, aspheric to minimize an aberration induced by the position of the objective lens 3. While this embodiment of the present invention has described the holographic objective lens 3 including the third holographic lens region 3c with reference to FIG. 4A, as shown in FIG. 4B, the holographic objective lens 3 may include a lens region 3c' having the same width but no holographic pattern instead of the third holographic lens region 3c. The lens region 3c' transmits all incident light.

Meanwhile, to obtain NAs appropriate for BD and DVD, the holographic objective lens 3 may comprise a first ring-shaped holographic lens region and either a second circular holographic lens region or a lens region with no holographic pattern. The first holographic lens region may have a width corresponding to an NA of 0.7 to 0.9, and the second holographic lens region or the lens region with no holographic pattern may have a width corresponding to an NA of 0.6 to 0.7.

To remove a spherical aberration induced by a thickness difference during recording and/or reproducing of a high density recording medium which is thinner than DVD. such as a 0.1 mm thick BD, as described above, the liquid crystal panel 5 is preferably, though not necessarily, disposed in front of the objective lens 3. Here, the thickness difference refers to a difference between the thickness of a recording layer (to be described later) being recorded or reproduced and a thickness for which the objective lens 3 is designed. Preferably, though not necessarily, the liquid crystal panel 5 corrects the spherical aberration by changing the wavefront of one linearly polarized beam, such as a P-polarized beam, incident from the light source module as needed, and transmits the other linearly polarized beam, such as an S-polarized beam, reflected from the recording medium 1 without a change to the wavefront.

More specifically, taking the arrangement of an optical system shown in FIG. 1 as an example, P-polarized light in a beam emitted by the first light source 25 is reflected from the polarization beam splitter 34 toward the objective lens 3. When the liquid crystal panel 5 operates to compensate for a spherical aberration, the P-polarized light reflected from the polarization beam splitter 34 has a wavefront of an inverse spherical aberration while passing through the liquid crystal panel 5, in order to correct for the spherical aberration induced by the thickness difference, and is then transformed into one circularly polarized light by the waveplate 4. The one circularly polarized light is then reflected from the recording medium 1 and transformed into the other circularly polarized light. The other circularly polarized light again passes through the waveplate 4 and is transformed into S-polarized light that in turn passes through the liquid crystal panel 5 without change to its wavefront, and then the polarization beam splitter 34, and is incident on the photodetector 39.

The reasons for selectively compensating for a spherical aberration using the liquid crystal panel 5 while recording and/or reproducing a high density recording medium which is thinner than a DVD will now be described in detail. When the effective NA of the objective lens 3 for the high density recording medium is 0.85, as described above, the high density recording medium must have a small thickness of about 0.1 mm to prevent a coma aberration due to the high NA.

Here, the thickness of the recording medium 1 refers to a distance from the surface of a protective layer to a recording layer. In a dual layer recording medium which will be described later, the thickness of first recording layer L0 is the distance between the surface of a protective layer and the recording layer L0, and the thickness of second recording layer L1 is the distance between the surface of the protective layer and the second recording layer L1. In a recording medium having a plurality of recording layers, the thickness of the recording medium may be equal to that of a specific recording layer or the distance from the surface of a protective layer to a predetermined position between the plurality of recording layers. Thus, it should be noted that the thickness of a recording layer or a recording medium described herein or in the claims means the same as above.

For example, in a dual-layer high density recording medium having two recording layers on at least one side thereof and, approximately 0.1 mm thick and using an approximately 0.85 NA objective lens, the objective lens 3 may be optimized with respect to the thickness of either recording layer of the two recording layers or to a distance between the protective layer and a predetermined position between the two recording layers. The liquid crystal panel 5 is designed and driven to eliminate a spherical aberration caused by a difference between the thickness of a recording layer being recorded or reproduced and the thickness for which the objective lens 3 is designed while recording or reproducing a high density recording medium having a plurality of recording layers on at least one side thereof.

For example, assuming that recording layers L0 and L1 in a dual-layer high density recording medium are 100 and 80 µm thick, respectively, and the objective lens 3 is optimized with respect to a thickness 90 µm of the recording medium, the liquid crystal panel 5 must be designed to remove a spherical aberration during recording and/or reproducing of the two recording layers L0 and L1. Since there is a thickness difference of 10 µm from the thickness 90 µm for which the objective lens 3 is optimally designed during recording and/or reproducing of the recording layer L0, a spherical aberration of −0.1 λrms may be induced. Thus, to compensate for the spherical aberration, the liquid crystal panel 5 can be driven to introduce an inverse spherical aberration corresponding to +0.1 λrms into a beam that has passed through the liquid crystal panel 5. Similarly, since there is a thickness difference of −10 µm from the thickness 90 µm for which the objective lens 3 is optimally designed during recording and/or reproducing of the recording layer L1, a spherical aberration of +0.1 λrms may be induced. Thus, to compensate for the spherical aberration, the liquid crystal panel 5 can be driven to introduce an inverse spherical aberration corresponding to −0.1 λrms into a beam that has passed through the liquid crystal panel 5.

Similarly, when the thickness for which the objective lens is optimized is equal to that of one recording layer L0 or L1, the liquid crystal panel 5 is designed and driven to correct for a spherical aberration only during recording and/or reproducing of the other recording layer L1 or L0. By introducing an inverse spherical aberration to that induced due to a thickness difference of the high density recording medium which is thinner than a DVD, the liquid crystal panel 5 offsets the two spherical aberrations from each other, thereby compensating for the spherical aberration caused during recording and/or reproducing of the recording medium.

Although the discussion of this embodiment of the present invention has described the liquid crystal panel 5 that compensates for a spherical aberration when there is a difference between the thickness of a recording layer being recorded or reproduced and a thickness for which the objective lens 3 is designed, this is only an example. That is, when the thickness of the high density recording medium is set to 0.1 mm, due to manufacturing error, the actual thickness of the high density recording medium may deviate from 0.1 mm, or a thickness difference may be present according to a location on the high density recording medium. The liquid crystal panel 5 can also be designed and driven to compensate for spherical aberrations induced by the thickness deviation due to manufacturing error as described above.

Meanwhile, the objective lens 3 is driven in focusing and tracking directions by an actuator 6 on which the liquid crystal panel 5 and the waveplate 4 are preferably, though not necessarily, mounted together with the objective lens 3. Although FIG. 1 illustrates an example in which the liquid crystal panel 5 is integrated with the waveplate 4, they may be separated from each other.

The compatible optical pickup according to this embodiment of the present invention further includes a grating 31 that is disposed on an optical path between the light source module 20 and the polarization beam splitter 34 to diffract incident light into three or more beams in order to detect a tracking error signal TES using a three-beam and/or differential push-pull (DPP) method. When a zero-order diffracted beam produced by the grating 31 is a main beam, and plus and minus first-order diffracted beams are sub beams, the grating 31 has a suitable pitch such that the sub beams can be received into a sub beam reception area. In this case, the grating 31 is preferably, though not necessarily, optimized with respect to an optical system such that a ratio of plus first-order:zero-order:minus first-order diffracted beams is 1:10:1 or 1:15:1. Compatible optical pickups according to two different embodiments of the present invention which will be described later (See FIGS. 6 and 7) include a plurality of gratings 31, respectively, each of which preferably satisfies the above requirements.

The optical pickup according to this embodiment further includes a collimating lens 7 that is disposed between the polarization beam splitter 34 and the objective lens 3 to collimate a divergent beam emitted by the light source module 20 to a parallel beam. The same optical pickup further includes an astigmatic lens 37 that is disposed between the polarization beam splitter 34 and the photodetector 39 to introduce astigmatism into the incident beam in order to detect a focus error signal FES by an astigmatism method. As shown in FIG. 1, when the polarization beam splitter 34 is plate-shaped, the astigmatic lens 37 is preferably tilted in a direction opposite to the direction in which the plate-type polarization beam splitter is tilted in order to remove coma aberration induced when the light passes through the plate-type polarization beam splitter 34.

As illustrated in FIG. 5, the photodetector 39 preferably, though not necessarily, includes a main photodetector 39a that receives a main beam reflected from the recording medium 1, and first and second sub photodetectors 39b and 39c disposed on both sides of the main photodetector 39a to receive first and second sub beams reflected from the recording medium 1, respectively. Here, the main beam is a zero-order diffracted beam transmitted through the grating 31, and the first and second sub beams are plus and minus first-order diffracted beams.

The main photodetector 39a is preferably, though not necessarily, divided into four or more sections along a radial R direction of the recording medium 1 to allow detection of a tracking error signal TES by a main push-pull (MPP) method. A PDIC is divided into a main PDIC at the center and side PDICs. The MPP uses the main PDIC to perform the push-pull operation.

Furthermore, the main photodetector 39a is preferably, though not necessarily, divided into two or more sections along a tangential T direction of the recording medium 1 to allow detection of a focus error signal FES by an astigmatic method and/or a tracking error signal TES by differential phase detection (DPD).

FIG. 5 shows an example of the main photodetector 39a divided into eight sections A1, A2, B1, B2, C1, C2, D1, and D2: four sections in the R direction and two sections in the T direction. The first and second sub photodetectors 39b and 39c are preferably, though not necessarily, divided into two halves, E1 and E2 and F1 and F2, respectively, in the R direction to allow detection of a tracking error signal by DPP.

Using the sectional structure of the photo detector 39 and the optical configuration of the compatible optical pickup of FIG. 1, a focus error signal FES, a tracking error signal TES, and a reproduced information signal RF-SUM can be obtained as shown in Table 1:

TABLE 1

|  | ROM | Recordable |
|---|---|---|
| FES |  | Astigmatic method = (B1 + B2 + D1 + D2) − (A1 + A2 + C1 + C2) |
| TES | DPD | Push-Pull: (B1 + B2 + C1 + C2) − (A1 + A2 + D1 + D2) |
|  |  | MPP: ((B1 + C1) − (A1 + D1)) − α((B2 + C2) − (A2 + D2)) |
|  |  | DPP: ((B1 + B2 + C1 + C2) − (A1 + A2 + D1 + D2)) − β((E2 − E1) + (F2 − F1)) |
| RF-SUM |  | A1 + A2 + B1 + B2 + C1 + C2 + D1 + D2 |

In Table 1, α and β are gains, and ROM and recordable denote read-only media and recordable media such as R, RW, and RAM types. Here, while DPP is mainly used for RAM-type media or BD, Push-Pull or MPP is mainly used for R/RW-type media. DPP can be used for R/RW-type media as well.

As described above, the compatible optical pickup may include the light source module 20 that emits beams having a plurality of wavelengths including a blue-violet beam. However, a compatible optical pickup of the present invention may have an optical unit 110 including a two wavelength light source module 120 for CD and DVD and a light source 125 for a high density recording medium separated as shown in FIG. 6, or an optical unit 210 having separated light sources 220, 230, and 240 for CD, DVD, and high density recording medium, respectively, as shown in FIG. 7. Elements that perform the same or similar functions as described with references to FIGS. 1 and 2 are denoted by like reference numerals, and an explanation thereof will not be given.

Referring to FIG. 6, the optical unit 110 of the compatible optical pickup according to another embodiment of the present invention includes the light source 125 for the high density recording medium, the two wavelength light source module 120 for CD/DVD 120, and first and second light path changers 134 and 135 that change the propagation paths of the beams emitted by the light source 125 and the two wavelength light source module 120, respectively. The two wavelength light source module 120, commonly referred to as a TWIN LD, has semiconductor lasers that emit a red beam having a 650 nm wavelength for DVD, and an infrared beam having a 780 nm wavelength for CD, disposed close to each other and constructed by a single module.

As shown in FIG. 6, gratings 31 are disposed between the light source 125 for high density recording medium and the first light path changer 134, and between the two wavelength light source module 120 and the second light path changer 135. Two monitor photodetectors 136 and 137 receive the beams emitted by the light source 125 and the two wavelength light source module 120 and passing through the first and second light path changers 134 and 135, respectively, to monitor the respective light output powers.

Meanwhile, the first light path changer 134 preferably, though not necessarily, acts as a polarization beam splitter for a blue-violet beam having a 405 nm wavelength emitted by the light source 125 for high density recording medium while transmitting most of the beams emitted by the two wavelength light source module 120. The second light path changer 135 preferably, though not necessarily, transmits and reflects the beams emitted by the two wavelength light source module 120 at a predetermined ratio while transmitting most of the blue-violet beam. Here, the second light path changer 135 may act as a polarization beam splitter for the beams emitted by the two wavelength light source module 120. Furthermore, the first light path changer 134 may act as a polarization beam splitter for all incident beams, regardless of their wavelengths, whereas the second light path changer 135 may transmit and reflect the same at a predetermined ratio, regardless of their wavelengths. In FIG. 6, the first and second light path changers 134 and 135 are plate-shaped and cubic, respectively, but various changes in their shapes may be made.

Referring to FIG. 7, the optical unit 210 of the compatible optical pickup according to still another embodiment of the present invention includes first through third light sources 240, 230, and 220 for high density recording medium, DVD, and CD, respectively, and first through third light path changers 244, 234, and 224 for changing the propagation paths of beams emitted by the first through third light sources 240, 230, and 220, respectively. The first through third light sources 240, 230, and 220 emit a blue-violet beam having a 405 nm wavelength, a red beam having a 650 nm wavelength, and an infrared beam having a 780 nm wavelength, respectively.

As shown in FIG. 7, a grating 31 is disposed between each of the first through third light sources 240, 230, and 220 and each of the first through third light path changers 244, 234, and 224. Furthermore, three monitor photodetectors 249, 239, and 229 receive the beams emitted by the first through third light sources 240, 230, and 220 and passing through the first through third light path changers 244, 234, and 224, respectively, to monitor the light output powers of the first through third light sources 240, 230, and 220.

Meanwhile, the first light path changer 244 preferably, though not necessarily, acts as a polarization beam splitter for the blue-violet beam having a 405 nm wavelength emitted by the first light source 240, while transmitting most of the beams emitted by the second and third light sources 230 and 220. The second light path changer 234 preferably, though not necessarily, includes a beam splitter that transmits and reflects the beam emitted by the second light source 230 according to a predetermined ratio, while transmitting most of the beams emitted by the first and third light sources 240 and 220. Similarly, the third light path changer 224 preferably, though not necessarily, includes a beam splitter that transmits and reflects the beam emitted by the third light source 220 according to a predetermined ratio, while transmitting most of the beams emitted by the first and second light sources 240 and 230. Here, the second and third light path changers 234 and 224 may act as a polarization beam splitter for the beams emitted by the second and third light sources 230 and 220, respectively. Furthermore, the first light path changer 244 may act as a polarization beam splitter for all incident beams, regardless of their wavelengths, whereas the second and third light path changers 234 and 224 may transmit and reflect the same according to a predetermined ratio, regardless of their wavelengths. In FIG. 7, the first and second light path changers 244 and 234 are cubic and the third light path changer 224 is plate-shaped, but various changes in their shapes may be made.

The compatible optical pickups according to the above embodiments of the present invention can record and/or reproduce a plurality of recording media 1 having different recording densities and formats with the holographic objective lens 3. Thus, use of the holographic objective lens 3 eliminates the need for separate optical systems for a high density recording medium and lower density recording media. With the holographic objective lens 3, it is possible to achieve a plurality of effective NAs for a plurality of beams having different wavelengths Furthermore, the optical pickup of the present invention includes the liquid crystal panel 5 for compensating for a spherical aberration, thereby allowing correction of the spherical aberration induced by a thickness difference during recording and/or reproducing of a high density recording medium that is thinner than a DVD and has a plurality of recording layers on at least one side thereof.

The optical pickup of the present invention can record and/or reproduce a high density recording medium thinner than a DVD and recording media having different thickness and recording densities using a single, common-use holographic objective lens, thereby providing a very simple optical system.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical pickup which is compatible with at least one high density recording medium that uses a blue-violet beam and is thinner than a digital versatile disc (DVD), and at least one lower density recording medium, the compatible optical pickup comprising:
    an optical unit to selectively emit one of a plurality of beams, at least one of which being the blue-violet beam, with different wavelengths onto one of the at least one high density recording medium and the at least one lower density recording medium, and to receive the respective beam reflected from the respective recording medium to detect a reproduced information signal and/or error signal;
    a light source module comprising first, second, and third light sources to respectively emit the plurality of beams with the different wavelengths, the light source module being a packaged module within the optical unit; and
    a holographic objective lens to focus the respective beams emitted by the optical unit to a spot on a recording surface of the respective recording medium, the holographic objective lens comprising:
    a first ring-shaped holographic lens region, and
    a second holographic lens region located inside the first holographic lens region,
    wherein depths of holographic patterns of the first and second holographic lens regions respectively produce a first effective numerical aperture (NA) for the at least one high density recording medium and at least one additional effective NA suitable for the at least one lower density recording medium, such that the first holographic lens region has a holographic pattern of etching depths optimized to maximize a transmissivity of the blue-violet beam and minimize a transmissivity of another beam, of the plurality of beams.

2. The optical pickup of claim 1, wherein the optical unit further comprises:
    a first light path changer to change a propagation path of the respective beam emitted by the light source module; and
    a photodetector to receive the respective beam reflected from the recording medium and detect the information signal and/or error signal.

3. The optical pickup of claim 2, wherein the at least one lower density recording medium comprises the DVD and a compact disc (CD), and wherein:
    the first light source emits the blue-violet beam onto the at least one high density recording medium;
    the second light source emits a red beam onto the DVD; and
    the third light source emits an infrared beam onto the CD.

4. The optical pickup of claim 2, wherein the first light path changer is a polarization beam splitter which splits the blue-violet beam.

5. The optical pickup of claim 4, further comprising a waveplate, disposed between the first light path changer and the objective lens, to change a polarization of an incident beam.

6. The optical pickup of claim 5, wherein the waveplate is a quarter waveplate for the blue-violet beam.

7. The optical pickup of claim 5, further comprising a liquid crystal panel, disposed on an optical path between the first light path changer and the waveplate, to compensate for a spherical aberration induced by a thickness difference in the at least one high density recording medium during recording and/or reproducing data to/from the at least one high density recording medium.

8. The optical pickup of claim 7, wherein the at least one high density recording medium is a blu-ray disc (BD) having a single recording layer or a plurality of recording layers on at least one side thereof.

9. The optical pickup of claim 1, wherein the at least one lower density recording medium comprises the DVD and a CD, wherein:
    the first light source emits the blue-violet beam onto the at least one high density recording medium; and
    the second and third light sources are embodied as a two wavelength light source module to selectively emit respective infrared and red beams onto the CD and the DVD, respectively,
    and wherein the optical unit further comprises:
    a first light path changer to change a propagation path of the beam emitted by the first light source; and
    a second light path changer to change a propagation path of the respective beam emitted by the two wavelength light source module.

10. The optical pickup of claim 9, wherein the first light path changer is a polarization beam splitter which splits the blue-violet beam.

11. The optical pickup of claim 10, further comprising a waveplate, disposed between the first light path changer and the objective lens, to change a polarization of an incident beam.

12. The optical pickup of claim 11, wherein the waveplate is a quarter waveplate for the blue-violet beam.

13. The optical pickup of claim 11, further comprising a liquid crystal panel, disposed on an optical path between the first light path changer and the waveplate, to compensate for a spherical aberration induced by a thickness difference in the at least one high density recording medium during recording and/or reproducing data to/from the at least one high density recording medium.

14. The optical pickup of claim 13, wherein the at least one high density recording medium is a BD having a single recording layer or a plurality of recording layers on at least one side thereof.

15. The optical pickup of claim 1, wherein the at least one lower density recording medium comprises the DVD and a CD, and wherein:
the first light source emits the blue-violet beam onto the at least one high density recording medium;
the second light source emits a red beam onto the DVD; and
the third light source emits an infrared beam onto the CD
wherein the optical unit further comprises first through third light path changers to respectively change propagation paths of the beams emitted by the first through third light sources.

16. The optical pickup of claim 15, wherein the first light path changer is a polarization beam splitter which splits the blue-violet beam.

17. The optical pickup of claim 16, further comprising a waveplate, disposed between the first light path changer and the objective lens, to change a polarization of an incident beam.

18. The optical pickup of claim 17, wherein the waveplate is a quarter waveplate for the blue-violet beam.

19. The optical pickup of claim 17, further comprising a liquid crystal panel, disposed on an optical path between the first light path changer and the waveplate, to compensate for a spherical aberration induced by a thickness difference of the at least one high density recording medium during recording and/or reproducing data to/from the at least one high density recording medium.

20. The optical pickup of claim 19, wherein the at least one high density recording medium is a BD having a single recording layer or a plurality of recording layers on at least one side thereof.

21. The optical pickup of claim 1, wherein the at least one lower density recording medium comprises the DVD and a CD, and wherein the holographic objective lens further comprises:
a third lens region, disposed inside the second holographic lens region;
wherein the second holographic lens region is ring-shaped, and produces a second effective NA for the DVD;
the third lens region produces a third effective NA for the CD; and
the first holographic lens region and the second holographic lens region are designed to minimize the transmissivity of an infrared beam emitted for the CD.

22. The optical pickup of claim 21, wherein the third lens region is holographic.

23. The optical pickup of claim 21, wherein the first holographic lens region has a first holographic pattern optimized with respect to the at least one high density recording medium, and the second holographic lens region has a second holographic pattern optimized with respect to the DVD and the at least one high density recording medium.

24. The optical pickup of claim 23, wherein the at least one high density recording medium is a BD having a single recording layer or a plurality of recording layers on at least one side thereof.

25. The optical pickup of claim 21, wherein the first holographic lens region, the second holographic lens region, and the third lens region have widths corresponding to NAs of approximately 0.7 to 0.9, approximately 0.6 to 0.7, and approximately 0.45 to 0.6, respectively.

26. The optical pickup of claim 1, wherein the first holographic lens region has a holographic pattern optimized with respect to the at least one high density recording medium, and the second holographic lens region has a holographic pattern optimized with respect to the DVD and the at least one high density recording medium.

27. The optical pickup of claim 26, wherein the at least one high density recording medium is a BD having a single recording layer or a plurality of recording layers on at least one side thereof.

28. The optical pickup of claim 26, wherein the first and second holographic lens regions have widths corresponding to NAs of approximately 0.7 to 0.9 and approximately 0.6 to 0.7, respectively.

29. The optical pickup of claim 1, wherein the at least one high density recording medium comprises a second high density recording medium having approximately the same thickness as the DVD.

30. The optical pickup of claim 29, wherein the second high density recording medium is an advanced optical disc (AOD).

31. The optical pickup of claim 1, further comprising a liquid crystal panel, disposed on an optical path between the optical unit and the objective lens, to compensate for a spherical aberration induced by a thickness difference in the at least one high density recording medium during recording and/or reproducing data to/from the at least one high density recording medium.

32. The optical pickup of claim 31, wherein the at least one high density recording medium is a BD having a single recording layer or a plurality of recording layers on at least one side thereof.

33. The optical pickup of claim 2, wherein the light source module comprises:
a transparent window disposed at a position of an exit pupil of the light source module.

34. The optical pickup of claim 2, wherein the light source module comprises:
a beam-shaping prism disposed at a position of an exit pupil of the light source module.

35. The optical pickup of claim 34, wherein the first through third light sources are semiconductor lasers emitting elliptical beams, and wherein the beam-shaping prism converts the respective elliptical beams into circular beams.

36. The optical pickup of claim 34, wherein the first light source emits the blue-violet beam, and is disposed along a central axis of the light source module.

37. The optical pickup of claim 34, further comprising a holographic optical element to compensate for misalignment of an optical axis so that beams emitted by the second and third light sources are equal to that of the blue-violet beam emitted by the first light source.

38. The optical pickup of claim 1, wherein the holographic objective lens is aspheric, to minimize an aberration caused by a position of the objective lens.

39. The optical pickup of claim 1, further comprising an actuator to drive the holographic objective lens in focusing and tracking directions.

40. The optical pickup of claim 2, further comprising a grating, disposed on an optical path between the light source module and the light path changer to diffract incident light into three or more beams in order to detect a tracking error signal.

41. The optical pickup of claim 40, wherein the grating is optimized with respect to an optical system such that a ratio of plus first-order:zero-order:minus first-order diffracted beams is approximately 1:10:1 or 1:15:1.

42. An optical pickup which is compatible with at least one high density recording medium and at least one lower density recording medium, the optical pickup comprising:
- an optical unit to selectively emit one of a plurality of beams having different wavelengths according to the respective recording media, the optical unit comprising a light source module further comprising first, second, and third light sources to respectively emit the plurality of beams with the different wavelengths, the light source module being a packaged module within the optical unit; and
- a holographic objective lens having a plurality of lens regions according to the plurality of beams;
- wherein the lens regions produce different effective numeric apertures according to respective one of the plurality of beams emitted onto the respective recording media to selectively minimize transmissivity of the respective one of the plurality of beams based on wavelength,
- such that at least one lens region of the lens regions has a holographic pattern of etching depths optimized to maximize a transmissivity of a blue-violet beam and minimize a transmissivity of another beam, of the plurality of beams.

43. An optical pickup which is compatible with at least one high density recording medium and at least one lower density recording medium, the optical pickup comprising:
- an optical unit to selectively emit one of a plurality of beams having different wavelengths, the optical unit comprising a light source module comprising first, second, and third light sources to respectively emit the plurality of beams with the different wavelengths, the light source module being a packaged module within the optical unit; and
- an objective lens to adjust a numerical aperture by selectively diffracting an incident beam according to a wavelength of the incident beam to selectively minimize transmissivity of the incident beam based on wavelength,
- such that the objective lens has a holographic pattern of etching depths optimized to maximize a transmissivity of a blue-violet beam and minimize a transmissivity of another beam, of the plurality of beams.

44. A holographic objective lens for an optical pickup that is compatible with at least one high density recording medium and at least one lower density recording medium, the lens comprising:
- a plurality of holographic lens regions having different optical properties;
- wherein the lens regions provide a plurality of effective numerical apertures for a plurality of incident light beams having different wavelengths to selectively minimize transmissivity of respective beams through the holographic lens based on wavelength,
- such that at least one lens region of the lens regions has a holographic pattern of etching depths optimized to maximize a transmissivity of a blue-violet beam and minimize a transmissivity of another beam, of the plurality of beams.

45. An optical pickup which is compatible with at least one high density recording medium and at least one lower density recording medium, the optical pickup comprising:
- a liquid crystal panel to compensate for a spherical aberration caused by differences in thickness between different data layers of the at least one high density recording medium; and
- a lens comprising a plurality of holographic lens regions having different optical properties, wherein the lens regions provide a plurality of effective numerical apertures for a plurality of incident light beams having different wavelengths to selectively minimize transmissivity of respective beams through the holographic lens based on wavelength,
- such that at least one lens region of the lens regions has a holographic pattern of etching depths optimized to maximize a transmissivity of a blue-violet beam and minimize a transmissivity of another beam, of the plurality of beams.

46. An optical pickup which is compatible with at least one high density recording medium and at least one lower density recording medium, the optical pickup comprising:
- a single holographic objective lens;
- wherein the lens selectively focuses one of a plurality of light beams having different wavelengths onto one of the at least one high density recording medium and the at least one lower density recording medium by selectively minimizing transmissivity of respective incident beams through the lens based on wavelength,
- such that the lens region has a holographic pattern of etching depths optimized to maximize a transmissivity of a blue-violet beam and minimize a transmissivity of another beam, of the plurality of beams.

* * * * *

UNITED STATES PATENT AND TRADEMARK OFFICE
CERTIFICATE OF CORRECTION

PATENT NO. : 7,586,826 B2 Page 1 of 1
APPLICATION NO. : 10/882154
DATED : September 8, 2009
INVENTOR(S) : Soo-han Park et al.

It is certified that error appears in the above-identified patent and that said Letters Patent is hereby corrected as shown below:

Column 15, Line 11, change "CD" to --CD,--.

Signed and Sealed this

First Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,586,826 B2
APPLICATION NO. : 10/882154
DATED : September 8, 2009
INVENTOR(S) : Park et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 939 days.

Signed and Sealed this

Twenty-first Day of September, 2010

David J. Kappos
*Director of the United States Patent and Trademark Office*